United States Patent [19]

Sone

[11] Patent Number: 5,499,921
[45] Date of Patent: Mar. 19, 1996

[54] KARAOKE APPARATUS WITH VISUAL ASSISTANCE IN PHYSICAL VOCALISM

[75] Inventor: Takurou Sone, Hamamatsu, Japan

[73] Assignee: Yamaha Corporation, Japan

[21] Appl. No.: 128,883

[22] Filed: Sep. 29, 1993

[30] Foreign Application Priority Data

Sep. 30, 1992 [JP] Japan .................................... 4-285198

[51] Int. Cl.[6] .............................. G10H 1/36; G09B 5/00
[52] U.S. Cl. ....................... 434/307 A; 434/318; 84/609
[58] Field of Search ........................... 434/307 R, 307 A, 434/308, 309, 318, 365; 84/601, 645, 609, 477 R, 454, 615; 369/50, 32, 48; 360/77.01, 33.1, 32; 358/342, 335, 310; 395/154, 160; 345/141, 147; 348/571, 595, 738, 478, 484

[56] References Cited

U.S. PATENT DOCUMENTS

| | | | |
|---|---|---|---|
| 4,519,008 | 5/1985 | Takenouchi et al. | 360/79 |
| 4,954,969 | 9/1990 | Tsumura | 345/191 X |
| 5,194,683 | 3/1993 | Tsumura et al. | 434/307 R |
| 5,208,413 | 5/1993 | Tsumura et al. . | |
| 5,243,582 | 9/1993 | Yamauchi et al. | 369/32 |
| 5,247,126 | 9/1993 | Okamura et al. . | |
| 5,250,747 | 10/1993 | Tsumura . | |
| 5,287,789 | 2/1994 | Zimmerman | 84/477 R |
| 5,296,643 | 3/1994 | Kuo et al. | 84/610 |
| 5,321,200 | 6/1994 | Yamamoto | 84/645 |
| 5,402,406 | 3/1995 | Fuma et al. | 369/84 |

FOREIGN PATENT DOCUMENTS

| | | |
|---|---|---|
| 3-116474 | 5/1991 | Japan . |
| 4-3386 | 1/1992 | Japan . |
| 4-190397 | 7/1992 | Japan . |

OTHER PUBLICATIONS

"Interface of Videotex Communication Network Service (Terminal)" Publication date: Aug. 25, 1984; Editor: Nippon Telegram and Telephone, Facility Division; Publisher: Electric Communication Society (Japan); English translation of pertinent part (pp. 73–85).

Primary Examiner—Joe Cheng
Attorney, Agent, or Firm—Graham & James

[57] ABSTRACT

A Karaoke apparatus reproduces an automatic instrumental accompaniment of a selected song during the course of a physical vocal performance of the selected song by a singer. A memory registers a prescribed text data of a selected song, containing accompaniment information and word information composed of a sequence of characters. A musical sound synthesizer reproduces an automatic instrumental accompaniment according to the registered accompaniment information. A graphic generator modifies a graphic pattern of each registered character in association with a predetermined practical manner of the physical vocal performance. A display unit displays a sequence of the characters in the modified graphic patterns concurrently with the reproduction of the automatic instrumental accompaniment so as to visually teach the singer the practical manner during the physical vocal performance.

5 Claims, 10 Drawing Sheets

FIG.13 ⊗ It's a little bit funny,⊘this feeling ⊙inside ○

FIG.14 It's a little bit funny, this feeling inside

FIG.15 It's a little bit funny, this feeling inside

FIG.16 It's a little bit funny, this feeling inside

FIG.17 It's a little bit funny, this feeling inside 5,499,921

KARAOKE APPARATUS WITH VISUAL ASSISTANCE IN PHYSICAL VOCALISM

BACKGROUND OF THE INVENTION

The present invention relates to a Karaoke apparatus for automatically sounding an instrumental accompaniment or "empty orchestra" ("Karaoke" in Japanese) accompaniment during a physical vocal performance of a selected song by a singer. More particularly, the present invention relates to a Karaoke apparatus provided with a tone generator in the form of a musical sound synthesizer operative according to registered performance information.

Recently, the Karaoke apparatus has become very popular. The Karaoke apparatus is equipped with an audio medium such as a magnetic tape or an optical disk for storing an instrumental accompaniment part of a popular song except for a vocal performance part. The singer physically performs the vocal part while the instrumental accompaniment part is being reproduced. A regular type of the Karaoke apparatus is installed with a mixer which mixes a physical singing voice picked up by a microphone with the Karaoke accompaniment together with a reverberation effect or else, thereby enjoying an interesting song performance. Further, an advanced type of the Karaoke apparatus utilizes a video medium such as an optical disk for displaying word information of the song as well as associated image information, in addition to the audio reproduction of the instrumental accompaniment. Such Karaoke apparatus is more and more sophisticated with respect to various aspects such as structure of the installed tone generator, manner by which word information is provided, and arrangement of peripheral equipments under divergent environment in amusement of the Karaoke performance.

Recently, one of the most advanced Karaoke apparatus is installed with a sophisticated tone generator, i.e., a musical sound synthesizer which is generally adopted in an electronic musical instrument or a computer music box. While the tone generator is driven according to registered performance information of the instrumental accompaniment, a display device is driven concurrently according to registered word information to visually indicate song words in the form of a sequence of characters in synchronization with the automatic instrumental accompaniment. In contrast to the regular Karaoke apparatus, the most advanced Karaoke apparatus utilizes simplified accompaniment information like a text data of a musical score, rather than audio information based on sampled analog waves, thereby saving a data amount and facilitating transfer and copy of the registered accompaniment information.

The conventional Karaoke apparatus displays the song words in the form of a sequence of characters having a plain letter style, and a color tone of each character is sequentially changed with the progression of the song performance to teach a vocal timing of each character. Namely in the conventional Karaoke apparatus, the displayed sequence of characters may merely indicate a literal form of the song words as well as a vocal timing of each character. The same is true with respect to the above mentioned advanced Karaoke apparatus which is equipped with the musical sound synthesizer driven according to the registered performance information to sound the instrumental accompaniment, while the display device is driven according to the registered word information to display a sequence of plain characters along with the sounding of the instrumental accompaniment. However, as the Karaoke amusement is widely popularized, the Karaoke apparatus is required to provide more helpful information to a performer in addition to basic audio and video information.

SUMMARY OF THE INVENTION

In view of the above noted drawbacks of the prior art, an object of the invention is to provide a Karaoke apparatus which offers more practical information and which enhances amusement of Karaoke performance.

The Karaoke apparatus for reproducing an automatic instrumental accompaniment of a selected song during the course of a physical vocal performance of the selected song by a singer, comprises register means for registering a prescribed text data of a selected song, containing accompaniment information and word information composed of a sequence of characters, sound means for reproducing an automatic instrumental accompaniment according to the registered accompaniment information, graphic means for modifying a graphic pattern of each registered character in association with a predetermined practical manner of the physical vocal performance, and display means for displaying a sequence of the characters in the modified graphic patterns concurrently with the reproduction of the automatic instrumental accompaniment so as to visually teach the singer the practical manner during the physical vocal performance.

In one expedient, a graphic pattern of each character is varied in association with a predetermined vocalism such as a voicing volume or else. In another expedient, a graphic pattern of each character is sequentially changed in association with a predetermined voice timing of each character. In either of the expedients, a size or a style of the graphic pattern is modified for a respective character.

In operation of the inventive Karaoke apparatus, song words are displayed in the sequence of characters having modified graphic patterns with the progression of the automatic instrumental accompaniment to thereby offer the singer helpful visual information including vocalism and voice timing to enhance amusement aspect of the Karaoke apparatus.

DETAILED DESCRIPTION OF THE INVENTION

Figure 1:
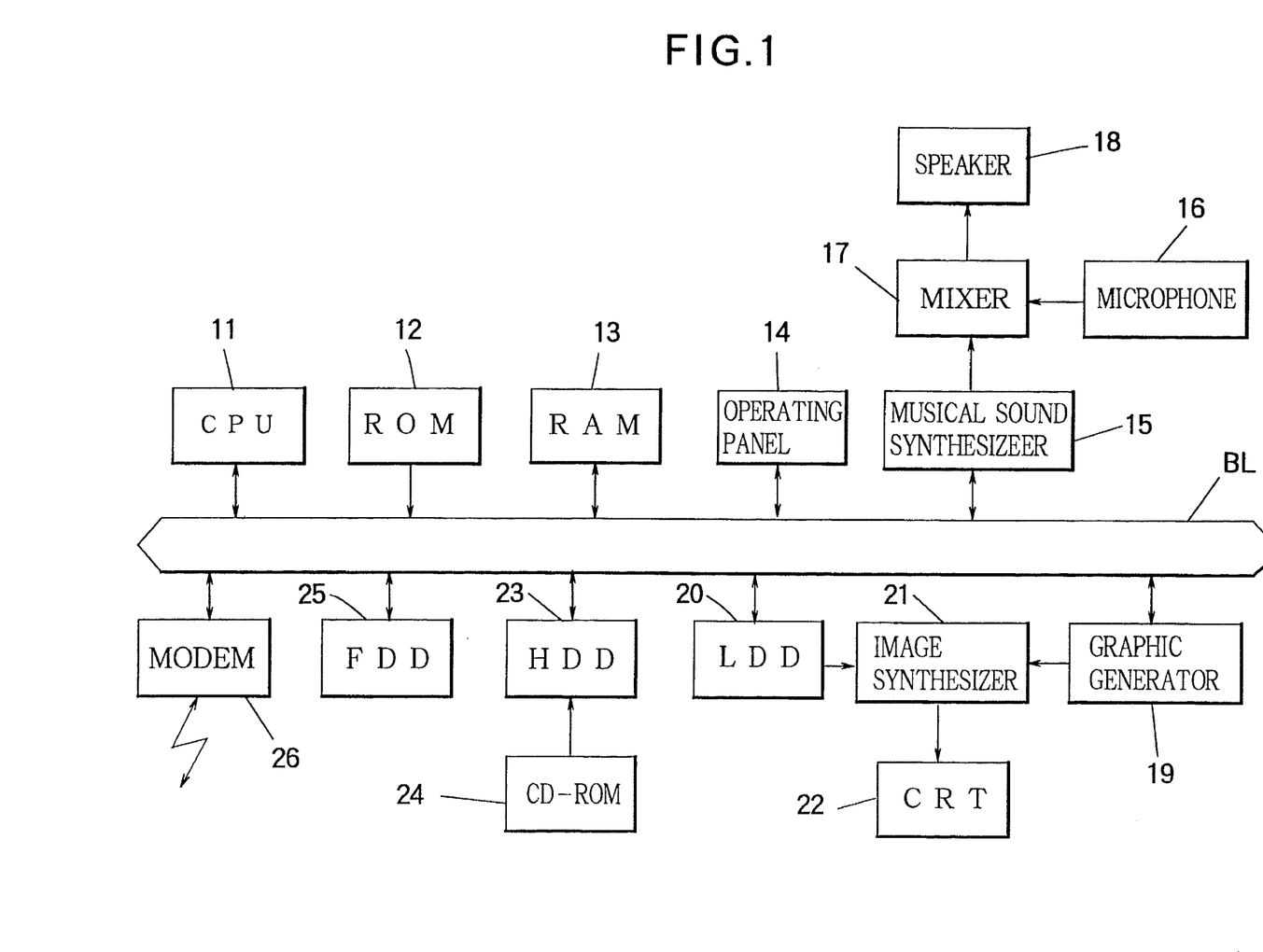
FIG. 1 is a block diagram schematically showing an overall construction of a first embodiment of the inventive Karaoke apparatus.

Hereinafter, preferred embodiments of the invention will be described in conjunction with the drawings. FIG. 1 schematically shows a first embodiment of the inventive Karaoke apparatus. In this embodiment, a display unit is utilized to indicate song words which are physically sung by a performer. The words are displayed in the form of a sequence of characters. A graphic pattern of an individual character is modified to visually teach a practical vocal manner to the performer. For example, either of a character size or character style is varied to teach a proper vocalism of a song which is selected by the performer.

The Karaoke apparatus of FIG. 1 is comprised of a central processing unit (CPU) 11, a read-only memory (ROM) 12, a random access memory (RAM) 13, an operating panel 14, a musical sound synthesizer 15, a microphone 16, a mixer 17, a loud speaker 18, a graphic generator 19 in the form of a computer graphic unit, an optical disk unit (LDD) 20, an image synthesizer 21, a display unit 22 such as a CRT, a hard disk unit (HDD) 23, a compact disk ROM unit (CD-ROM) 24, a floppy disk unit (FDD) 25 and a modem 26. In this embodiment, the modem 26 is utilized for an interface of a communication network. A common bus line BL is provided to connect altogether those of CPU 11, ROM 12, RAM 13, musical sound synthesizer 15, graphic generator 19, LDD 20, HDD 23, FDD 25 and modem 26.

The CPU 11 controls and manages entire operation of the Karaoke apparatus. The ROM 12 is written with an operation program including a performance control program which is used for reproducing an instrumental accompaniment. The RAM 13 is used when the CPU 11 controls and manages the operation of the Karaoke apparatus. The operation program stored in the ROM 12 is loaded into the RAM 13 by the control of the CPU 11 when the Karaoke apparatus is turned on. The operating panel 14 contains various manual pieces such as switches and knobs for operating the Karaoke apparatus.

The musical sound synthesizer 15 is driven according to accompaniment information to generate a musical sound signal of the instrumental accompaniment part. The synthesizer 15 is provided with a tone generator such as an MIDI tone generator and a controller for controlling the tone generator. The microphone 16 is used for picking up a voice of the performer who is singing accompanied by the Karaoke apparatus. The mixer 17 mixes outputs of the musical sound synthesizer 15 and the microphone 16 with each other. The mixer 17 is provided with an echo device or reverberation device, if desired, for adding reverberation effect to the output of the microphone 16. The speaker 18 is driven by an output of the mixer 17 to sound a complete song performance which is the mixture of the instrumental accompaniment part from the musical sound synthesizer 15 and the vocal part from the microphone 16.

The graphic generator 19 processes word information representative of words of a selected song and picture information representative of a still picture or a moving picture, those of which are registered together with the accompaniment information, to thereby generate a graphic signal for the display unit 22. The LDD 20 is actuated when the performer selects a particular song which is specified to use image information recorded in an installed optical disk. The LDD 20 is accessed according to indirect one of the picture information in synchronization with the accompaniment information to reproduce image information such as a given still image of a specified frame in a specified laser disk or a given moving image which starts from a specified frame in a specified optical disk. For this, the LDD 20 is preferably provided with auto-selecting function of plural optical disk. The image synthesizer 21 combines an output of the graphic generator 20 and another output of the LDD 20 with one another to synthesize a video signal. The display unit 22 such as CRT visually reproduces the video signal synthesized by the image synthesizer 21.

The hard disk unit 23 is stored with a text data of each Karaoke song, such as a song name, a singer name, a release date, key words, accompaniment information, picture information, measure and bar information, and word information. The operating panel 14 is actuated to select a desired song. The CPU 11 operates to load the text data of the selected song into the RAM 13. Then, the RAM 13 is accessed by the CPU 11 to read out the loaded or registered text data including the accompaniment information and the word information, which are separately fed to the musical sound synthesizer 15 and to the graphic generator 19, thereby effecting a Karaoke performance. The CD-ROM unit 24 is utilized to read out a source text data of each song stored in a memory medium of a CD-ROM to down-load the same into the hard disk unit 23.

The floppy disk unit 25 is provided for record and reproduction of the text data such as to write a certain text data of the hard disk unit 23 into a floppy disk, or such as to read out a text data from a floppy disk to down-load the same into the hard disk unit 23. The floppy disk is utilized to transfer the text data among Karaoke apparatuses.

The modem 26 is utilized to connect one Karaoke apparatus to another Karaoke apparatus or to a host system through a communication channel such as to transmit and receive a text data or other performance data.

In the Karaoke apparatus shown in FIG. 1, the CD-ROM unit 24 is operated to provisionally down-load a text data from a CD-ROM into the hard disk unit 23, while the LDD 20 is set with an optical disk if necessary. Alternatively, the text data down-loaded in the hard disk unit 23 is initially provided from a floppy disk by means of the floppy disk unit 25, or fed from the communication channel through the modem 26.

In operation of the Karaoke apparatus shown in FIG. 1, when a power source is turned on, the operation program written in the ROM 12 is loaded into the RAM 13 to initiate the operation. The operating panel 14 is actuated so that the CPU 11 commences according to the operation program in the RAM 13, various performances such as an automatic accompaniment. The above mentioned down-loading into the hard disk unit 23 is also initiated by the actuation of the operating panel 14 upon the turn-on of a power source under the control by the CPU 11. Then, the operating panel 14 is actuated to select a desired song so that a text data of the selected song is retrieved from the hard disk unit 23, and is loaded and registered into the RAM 13. The Karaoke performance is commenced according to the retrieved text data. During the course of the Karaoke performance, the musical sound synthesizer 15 sequentially generates according to the song text data a musical tone signal, which is sounded by the speaker 18 through the mixer 17. Meanwhile, the graphic generator 19 operates according to the word information contained in the song text data to generate a sequence of characters representative of the song words with progression of the song performance. The characters are displayed on the display unit 22 by means of the image synthesizer 21.

In this operation, a graphic pattern of each character such as a letter size is visually modified on the display unit 22 with the progression of the song performance according to prescribed modification information contained in the word information. The modification information is provisionally written and recorded according to a proper vocal manner of the selected song such that the displayed graphic pattern of each character is visually associated with expression manner of the song words. Further, a sequence of the displayed characters representative of the song words are successively turned to a different color with the progression of the song performance according to timing information contained in the word information, thereby teaching the performer a successive voice timing of the displayed characters. Moreover, the graphic generator 19 operates according to picture information contained in the text data to generate a picture with the progression of the song performance. The display unit 22 is driven by the image synthesizer 21 to display the picture in superposed relation to the characters of the song words. Optionally in case that a selected song specifies the use of an optical disk, a particular one is selected at the start of the song performance so that a designated section (i.e., a still picture or a motion picture) of the selected optical disk is reproduced according to the picture information contained in the text data. A reproduced image is displayed on the display unit 22 by means of the image synthesizer 21. Consequently, the performer can manage his own vocal manner according to each character pattern of the words visually indicated on the display unit 22.

Figure 2:
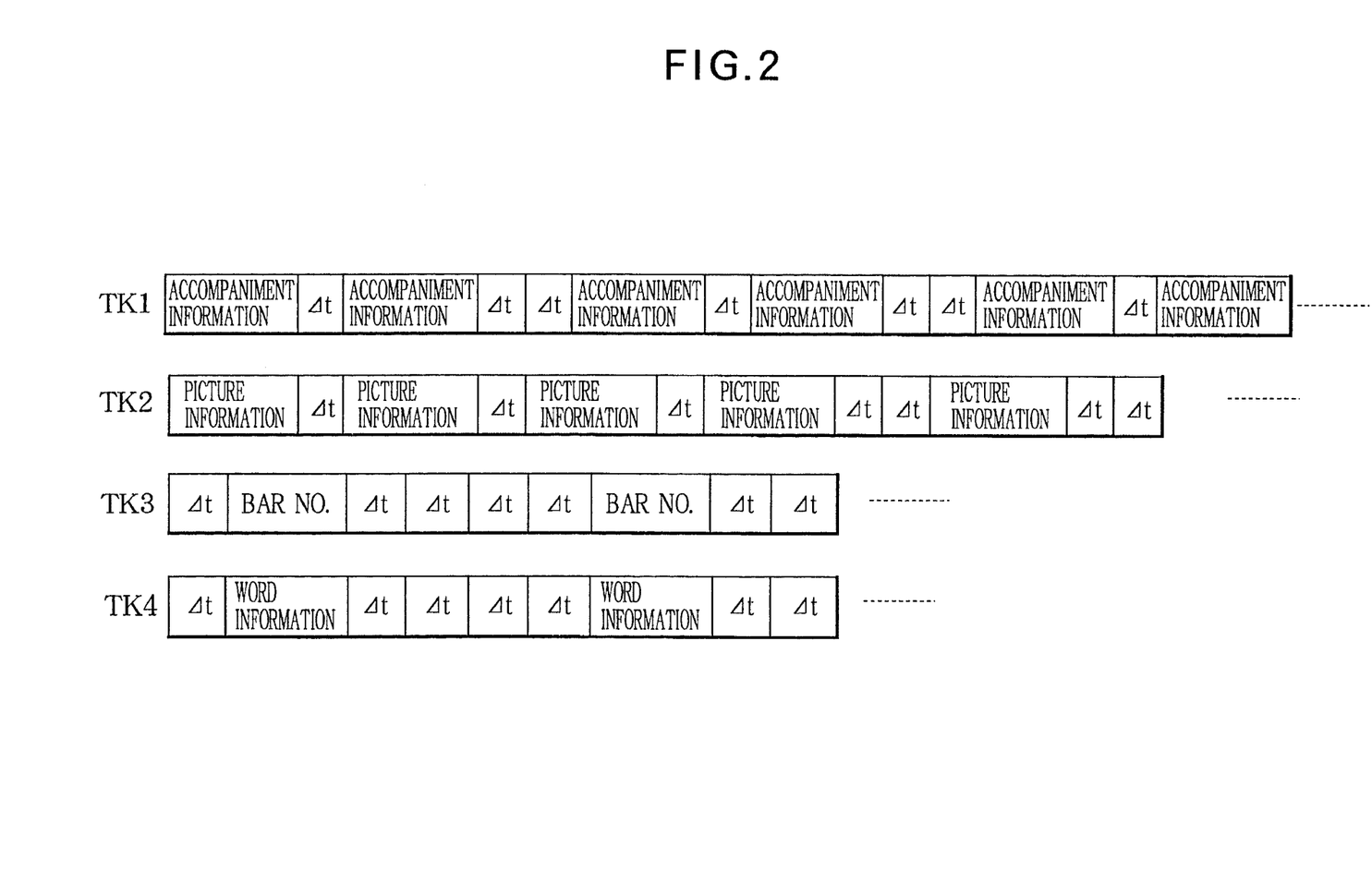
FIG. 2 is a diagram showing a format of performance data registered in the FIG. 1 embodiment.

In this embodiment, the text data of each song is mainly comprised of a performance data which is transferred to the RAM 13 from the hard disk unit 23, and is retrieved sequentially from the RAM 13 to effect performance. The performance data is registered in a given format as shown in FIG. 2. Namely, the performance data is recorded in a plurality of tracks TK1, TK2, TK3 and TK4. The first track TK1 is assigned with accompaniment information, which is provided for driving the sound synthesizer 15 to generate an accompaniment tone signal. The second track TK2 is assigned with picture information which is provided for driving the graphic generator 19 to generate a picture signal, and/or for driving the LDD 20 to designate an image to be reproduced from an optical disk. The third track TK3 is assigned with particular score information containing a sequence of bars. This score information may be used for effecting a specific performance, and therefore may be eliminated if the Karaoke system does not require such information. The fourth track TK4 is assigned with word information which is provided for driving the graphic generator 19 to generate a character signal effective to visually indicate the song words. If the second track TK2 contains direct picture information as image data, the graphic generator 19 generates a composite graphic signal composed of the picture signal according to the direct picture information and the character signal according to the word information. The image synthesizer 21 operates to synthesize, for the display unit 22, a video signal composed of the graphic signal containing at least the character signal generated by the graphic generator 19, and the image signal produced by the LDD 20.

Those of the various information are composed of a sequence of an event and a time interval ΔT. The event represents one tone in the accompaniment information, one frame in the picture information, one bar in the score information, and one phrase in the word information. The time interval Δt indicates a time length between adjacent events like MIDI data. For example, with regard to the track TK1 of the accompaniment information, an on-event is followed by an off-event while an interval Δt is interposed so that one tone is generated during a duration determined by the time interval Δt between the on-event and the off-event. Though the accompaniment information is illustratively written in a single of the first track TK1, practically the track TK1 is divided into a plurality of subtracks corresponding to different instruments involved in the orchestra accompaniment. Further, timbre information of each instrument may be included in the accompaniment information. In the FIG. 2 embodiment, the interval is set in terms of a minimum time unit Δt such that a desired interval length is set as a multiple of the minimum time units. Alternatively, each time interval may be set variably.

Figure 3:
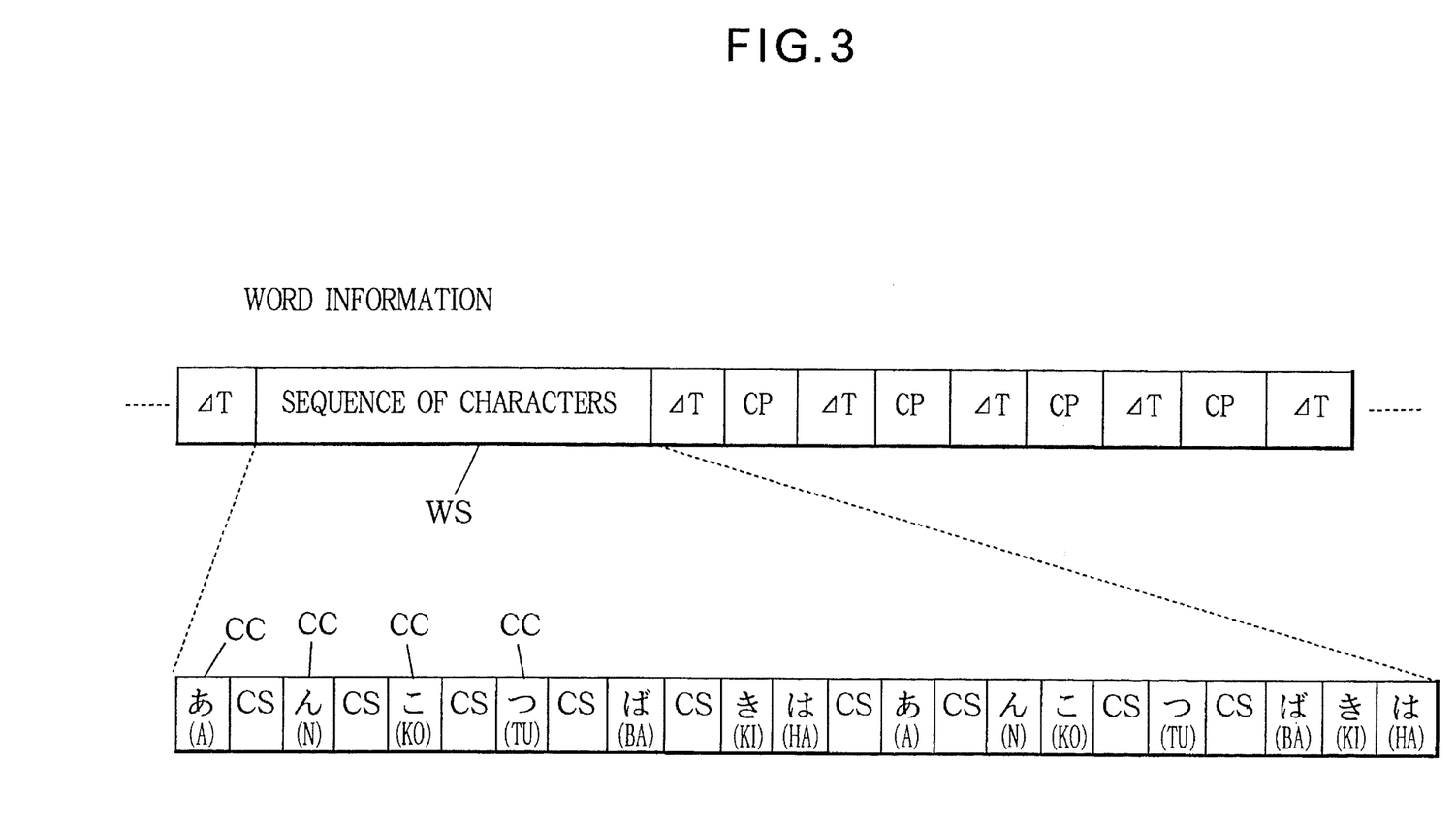
FIG. 3 is a diagram showing a detailed data format of word information contained in the performance data.

FIG. 3 shows a detailed data format of one section of the word information contained in the track TK4. The word information is comprised of a sequence of characters WS followed by voice timing information in the form of an alternate arrangement of a color change code CP and a time interval ΔT. Each color code CP is associated to a position of a corresponding character on the display unit. In this embodiment, the sequence of characters read as あ-ん-こ-つ-ば-き-ば-あ-ん-こ-つ-ば-き-ば, which is Japanese alphabetic expression of song words contained in a selected Japanese popular song. Hereinafter, an equivalent English alphabetic expression will be used in this specification for ease of reading, as indicated by "A-N-KO-TU-BA-KI-HA-A-N-KO-TU-BA-KI-HA". Each character is denoted by a character code CC and a pattern code CS which indicates either of character size or character style. Basically, each character is represented by a complete pair of the character code CC and the pattern code CS; however, the pattern code CS may be eliminated occasionally if successive characters have the same pattern code in view of data compaction.

Figure 4:
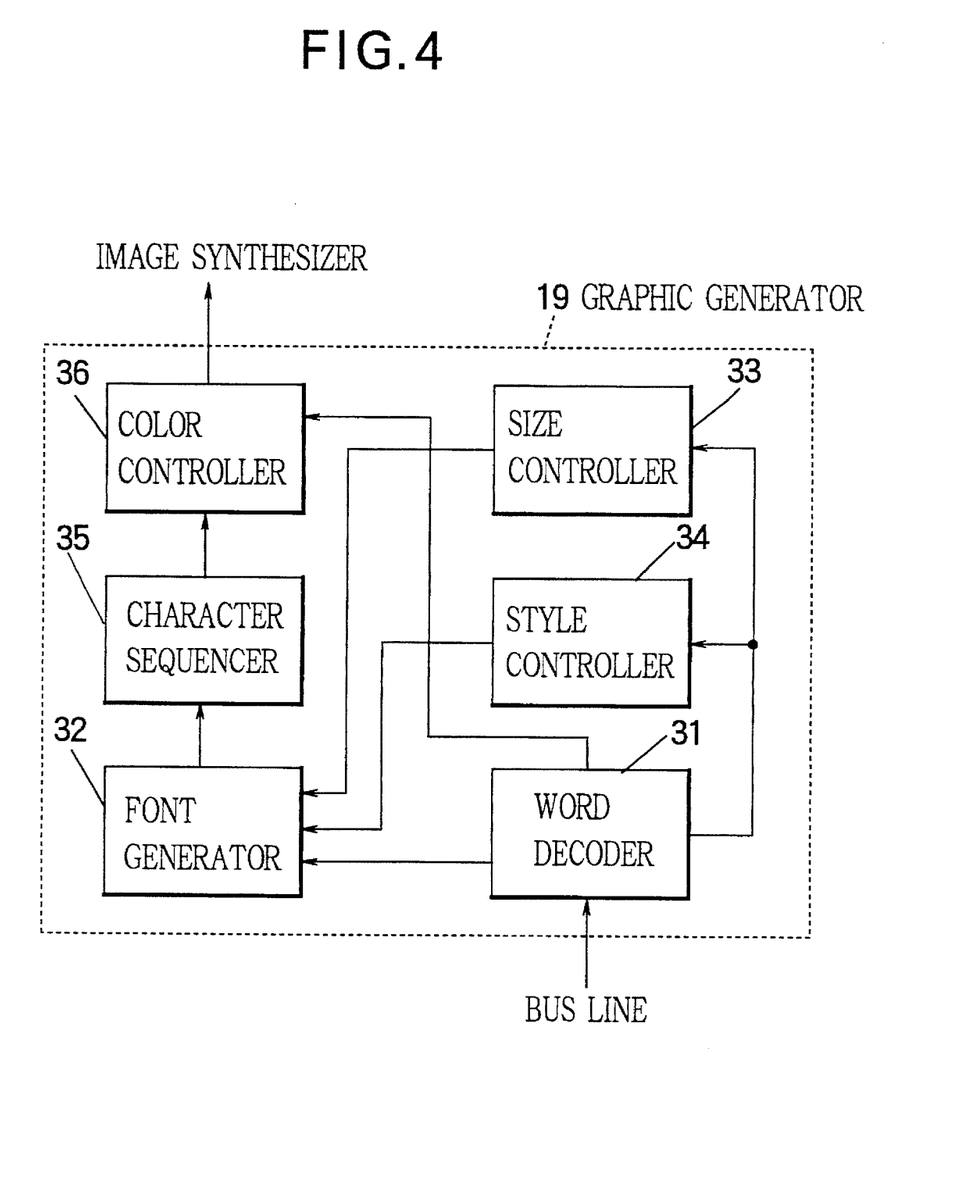
FIG. 4 is a block diagram showing a detailed construction of a graphic generator provided in the FIG. 1 embodiment.

The graphic generator 19 has a specific construction, as shown in FIG. 4, for displaying the sequence of characters in expressive manner according to the accompanied pattern codes. Namely, the graphic generator 19 is comprised of a word decoder 31, a font generator 32, a size controller 33, a style controller 34, a character sequencer 35 and a color controller 36. The word decoder 31 analyzes the word information shown in FIG. 3 to discriminate those of the character code CC, pattern code CS, color code CP and time interval ΔT so as to sequentially distribute the character codes and color codes according to the interposed time intervals, as well as to decode the pattern codes to produce a size data and a style data. The font generator 32 generates each character font according to the character code CC delivered by the word decoder 31. Further, the font generator 32 selects and sets a size and type of the font. The size controller 33 operates according to the size data fed from the word decoder 31 for controlling the font generator 32 to determine the size of the generated font. The style controller 34 operates according to the style data fed from the word decoder 31 to control the font generator 32 to determine the style of the generated font. The character sequencer 35 arranges position and order of the generated character fonts on the display unit 22. The color controller 36 operates according to the color code CP fed from the word decoder 31 for changing a color tone of each character visually indicated on the display unit 22 with the progression of the song performance.

Figure 5:
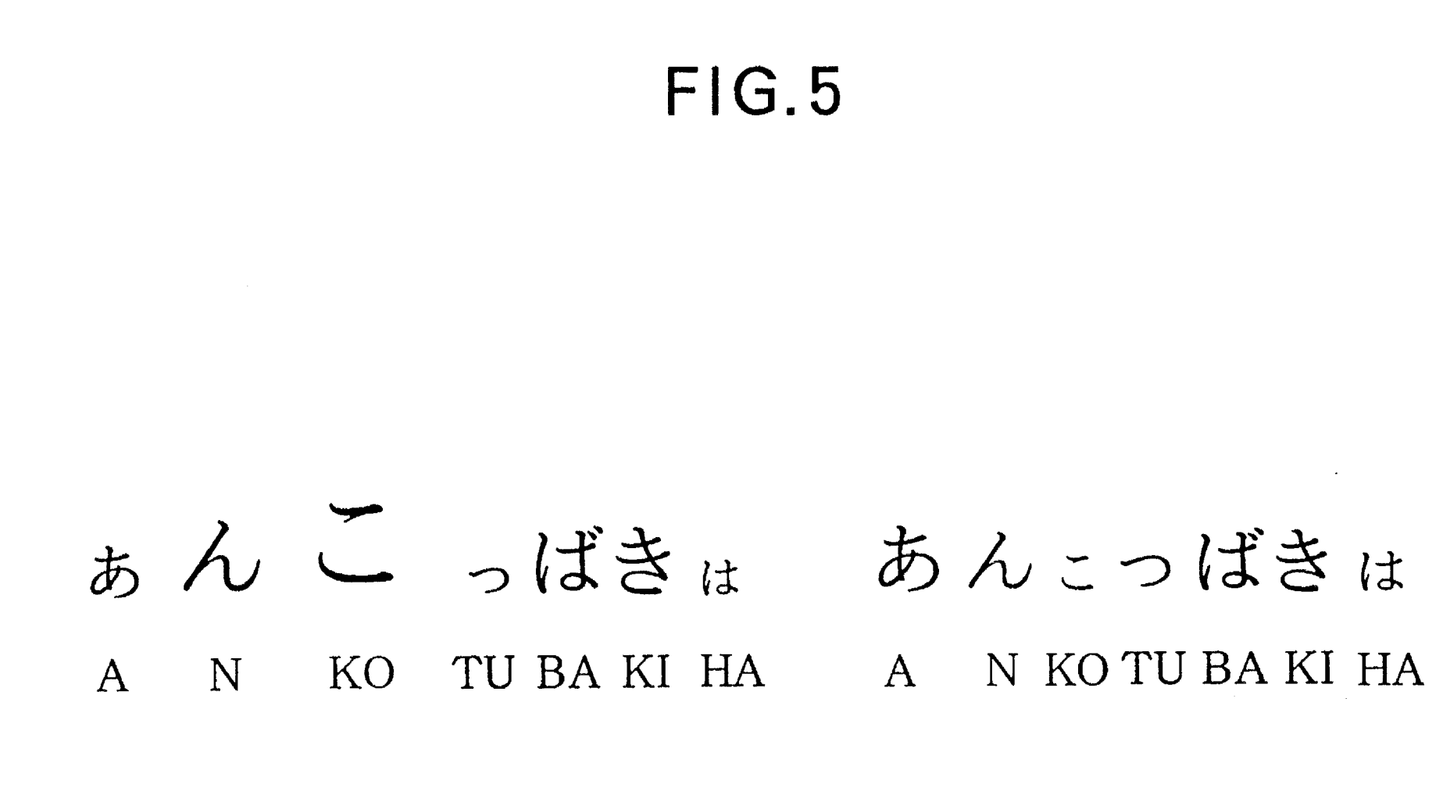
FIG. 5 is an illustrative view of displayed song words in the FIG. 1 embodiment.

Next, the detailed description is given for one example of word display scheme in this embodiment with reference to FIG. 5. The display unit 22 displays a sequence of characters "A-N-KO-TU-BA-KI-HA-A-N-KO-TU-BA-KI-HA" such that each character has a different size. In this embodiment, the vocalism of the selected song is prescribed in terms of the pattern codes CS such that the larger the character size, the louder the voice. Therefore, the performer sings the song while physically changing a voice volume according to the displayed size of each character in conformity with a proper vocalism. Namely in the FIG. 5 example, it is instructed as a proper singing manner such that the character "A" at first occurrence should be voiced rather weakly, the subsequent character "N" should be voiced strongly, the character "KO" should be voiced very strongly, the character "TU" should be voiced very weakly, the characters "BA" and "KI" should be voiced in middle volume, and the character "HA" should be voiced very weakly.

In addition to the volume instruction by the character size, the character style may be altered to instruct various voicing manners, such as a Gothic letter indicates groaning, a shaded letter indicates falsetto, a finely waved letter indicates vibrato, and a coarsely waved letter indicates a grace note.

Accordingly in the first embodiment of the Karaoke apparatus, the proper vocalism is graphically indicated by the character pattern (size and/or style) of the displayed words, while the voice timing is indicated by sequential changing of color tone of the displayed characters. Therefore, even a beginner may perform singing in conformity with proper vocal manner to thereby enjoy the Karaoke in skillful manner. Such a Karaoke apparatus is suitable for practicing a song performance. Instead of changing the character pattern itself, a display area of each character may be locally altered or deformed by image processing such as a designated display area is waved so that a corresponding character can be viewed as if waved.

Next, the description will be given for a second embodiment of the inventive Karaoke apparatus. In this embodiment, the vocal timing is indicated by selection of a specific character pattern such as a specific letter style, while the vocalism is indicated by other character patterns such as either of a different letter style and a letter size, thereby visually teaching the performer a proper singing manner by the displayed song words.

Figure 6:
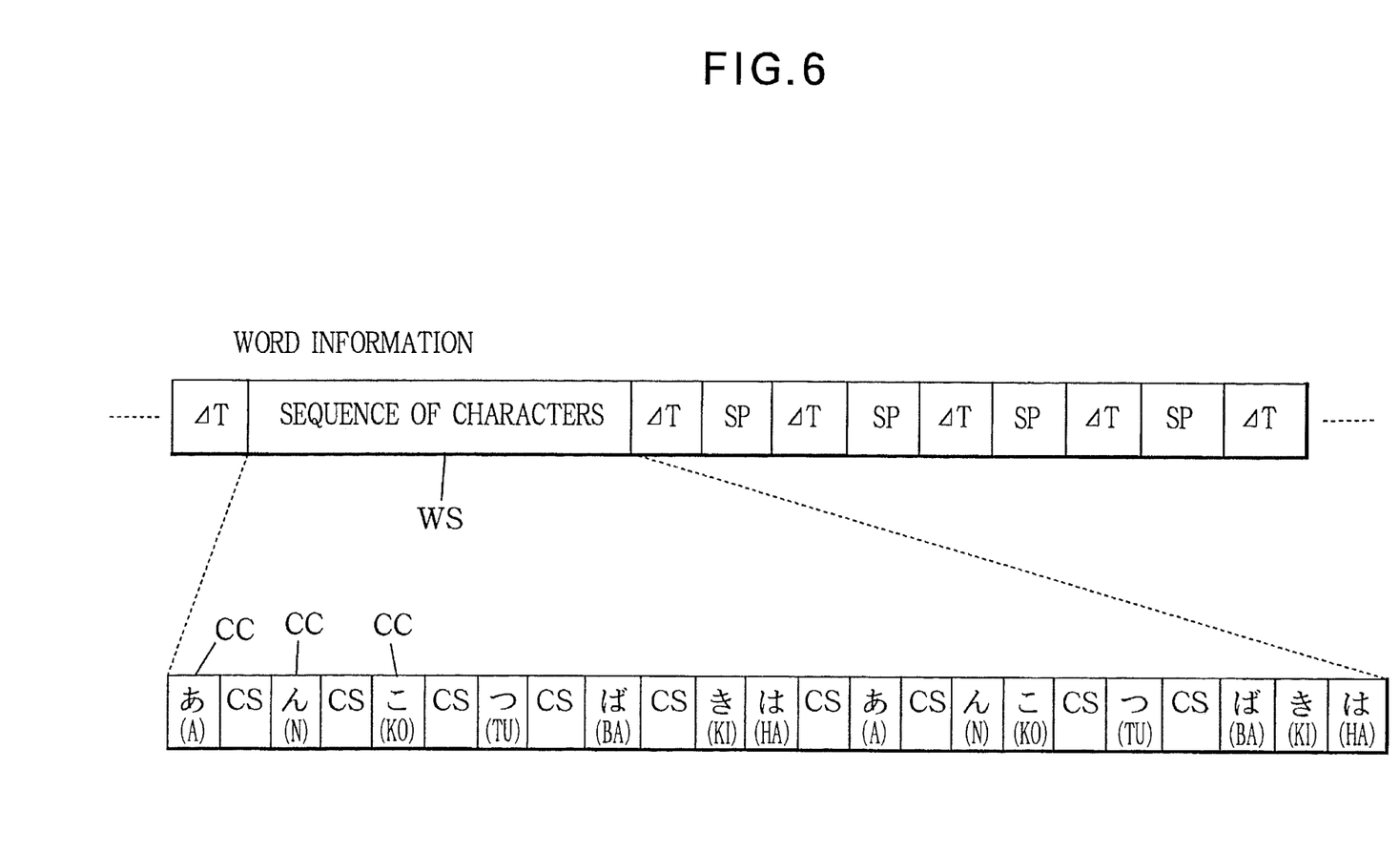
FIG. 6 is a diagram showing a detailed data format of word information registered in a second embodiment of the inventive Karaoke apparatus.

For this, the format and contents of the word information is different from that of the first embodiment. As shown in FIG. 6, the word information format of the second embodiment contains a sequence of characters WS followed by an alternate arrangement of a transient pattern code SP in place of the color code, and a time interval ΔT. Each transient pattern code SP is arranged in corresponding to each character involved in the sequence of the characters WS. Further, each character such as "A", "N", "KO" and so on is identified by a pair of a character code CC and an associative pattern code CS which indicates either of letter size or letter style of a corresponding character.

Figure 7:
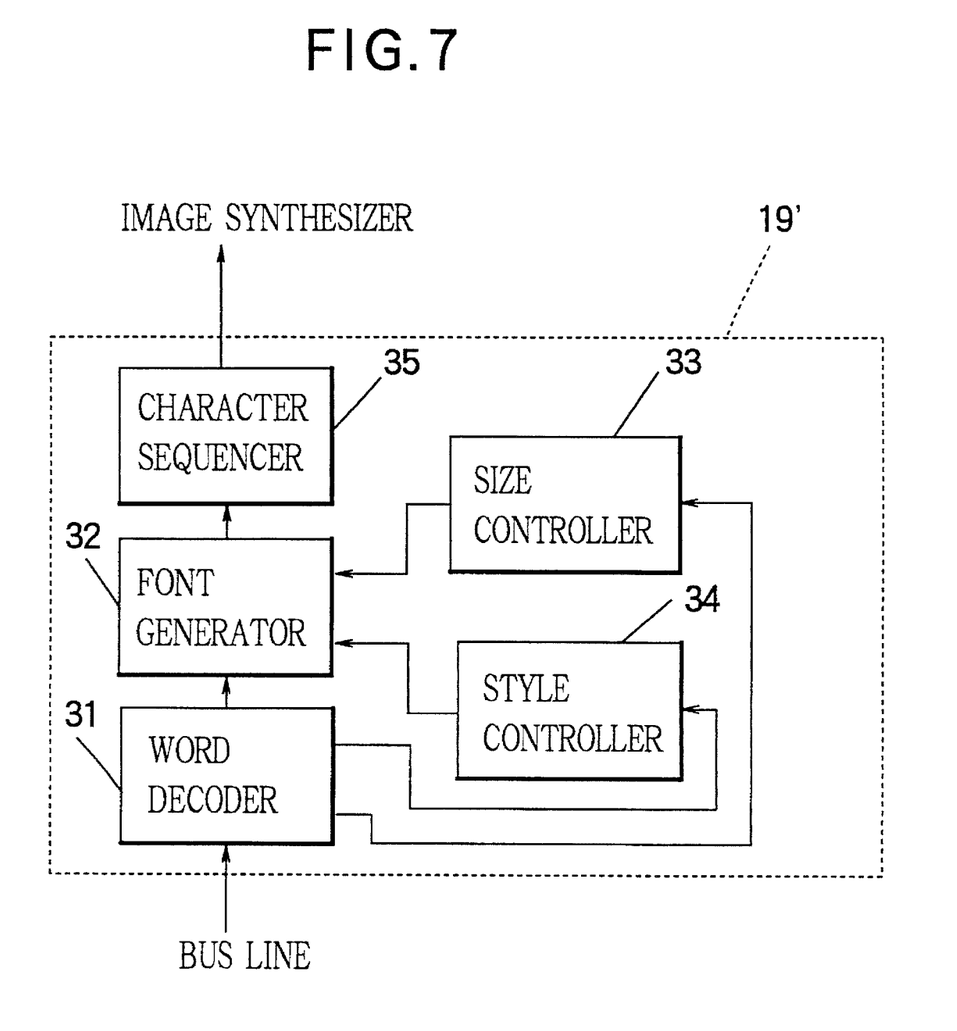
FIG. 7 is a block diagram showing a detailed construction of a graphic generator provided in the second embodiment.

As mentioned above, the sequence of characters are graphically displayed in the variable patterns designated by the corresponding associative pattern codes CS, while the vocal timing is indicated by timed selection of a transient character pattern, rather than timed changing of a character color tone. In view of this, the second embodiment utilizes another graphic generator 19' in place of the graphic generator 19 shown in FIG. 4. As shown in FIG. 7, the graphic generator 19' is comprised of a word decoder 31, a font generator 32, a size controller 33, a pattern controller 34 and a character sequencer 35, in addition to a basic structure of computer graphics (not shown). The word decoder 31 discriminates those of the character codes CC, the associative pattern codes CS, the transient pattern codes SP and the time intervals ΔT from the contents of the word information shown in FIG. 6. The word decoder 31 further distributes the discriminated character codes CC, as well as decodes both of the pattern codes CS and SP so as to generate a size data and a style data. The font generator 32 generates a character font according to each character code CC distributed from the word decoder 31. This font generator 32 further selects and sets the size and style of the generated character font. The size controller 33 operates according to the size data fed from the word decoder 31 for controlling the font generator 32 to determine the size of the generated character font. The style controller 34 operates according to the style data fed from the word decoder 31 for controlling the font generator 32 to determine the style of the corresponding character font generated by the font generator 32. The character sequencer 35 sequentially distributes each generated character font to the display unit in order through the image synthesizer.

Figure 8:
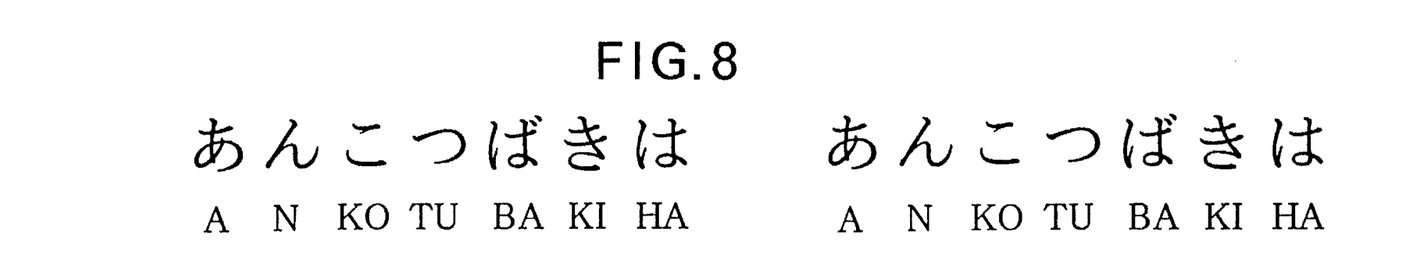
FIG. 8 is an illustrative view of displayed song words in the second embodiment.
Figure 9:
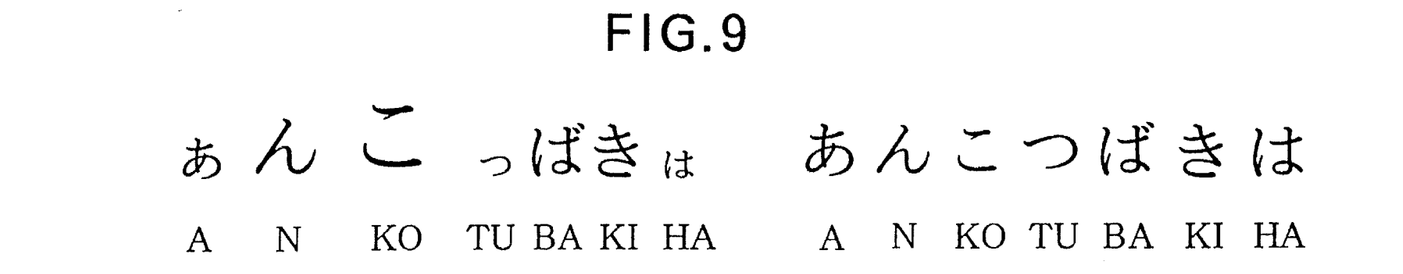
FIG. 9 is likewise an illustrative view of the displayed song words.
Figure 10:
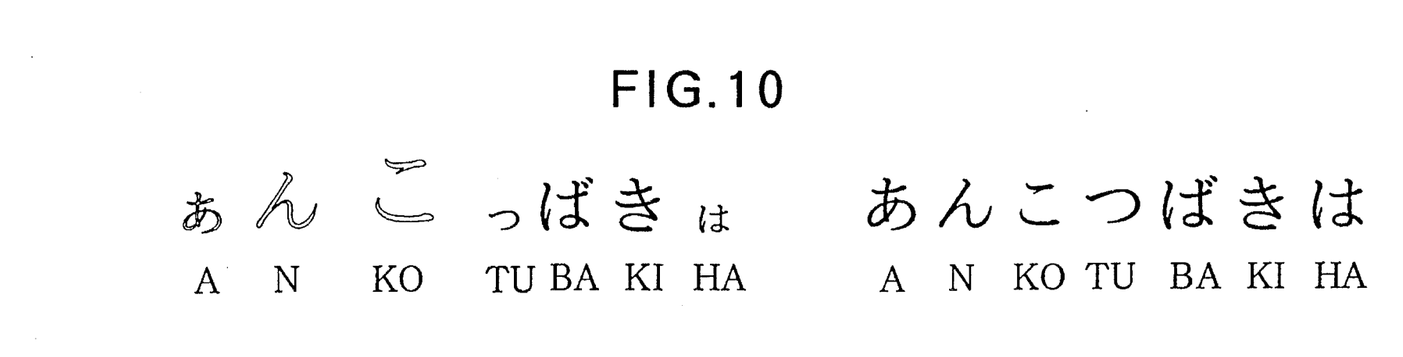
FIG. 10 is likewise an illustrative view of the displayed song words.
Figure 11:
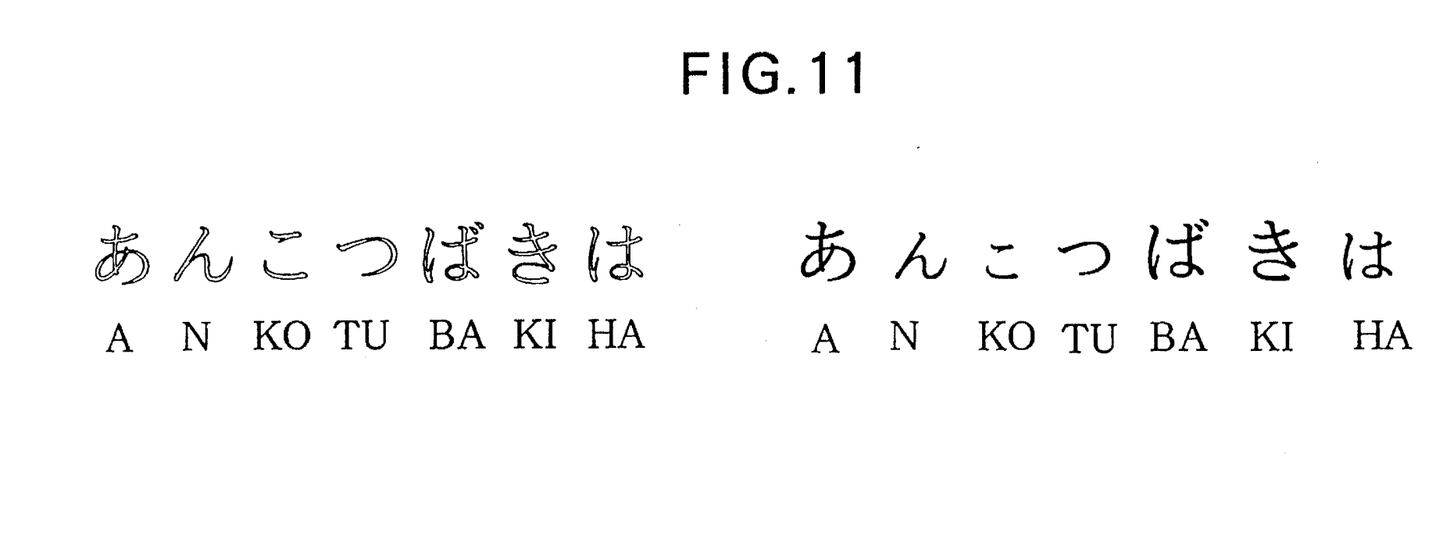
FIG. 11 is likewise an illustrative view of the displayed song words.
Figure 12:
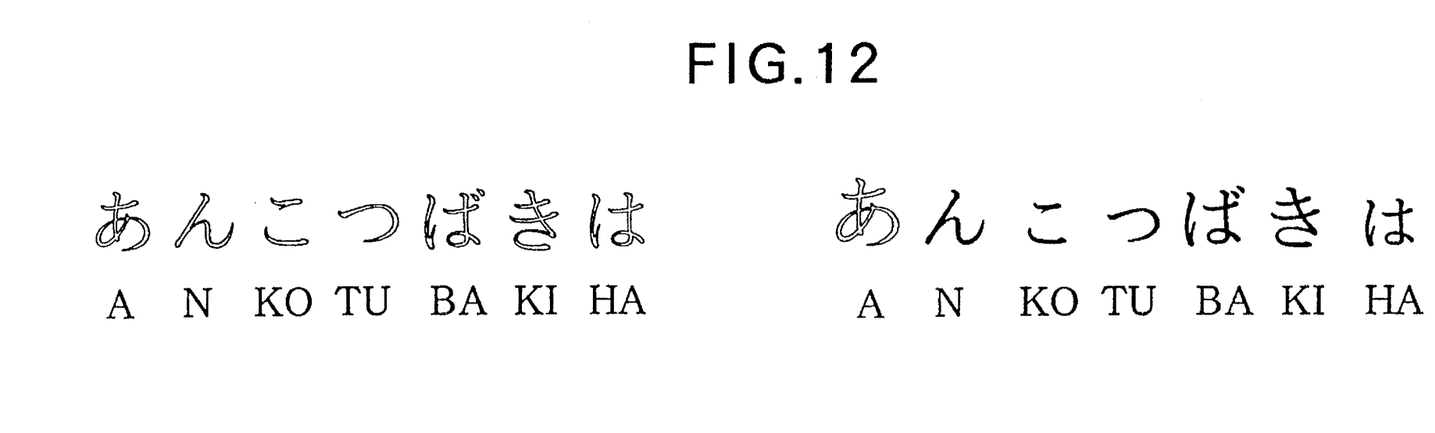
FIG. 12 is likewise an illustrative view of the displayed song words.

Next, the detailed description is given for an example of the expressive word display scheme in conjunction with FIGS. 8–12. In this embodiment, as shown in FIG. 8, the display unit 22 initially indicates song words "A-N-KO-TU-BA-KI-HA-A-N-KO-TU-BA-KI-HA" in plain manner such that all the characters have the same pattern. Next, as shown in FIG. 9, a first phrase "A-N-KO-TU-BA-KI-HA" is graphically altered such that each character is displayed in a different letter size according to the associative pattern code CS. At this stage, a second phrase "A-N-KO-TU-BA-KI-HA" is held as initially displayed. Then, as shown in FIG. 10, each character involved in the first phrase is successively changed from the black or solid style into a white or outlined style according to the transient pattern codes SP with the progression of the song performance to indicate voice timings of the first phrase while maintaining the varied size of each character. Then, after finishing the song performance of the first phrase, each character of the first phase is returned to the initial letter size while maintaining the white letter style thereof, as shown in FIG. 11. At the same time, each character of the second phase is switched from the common initial size to a different size indicative of the proper vocalism. Then, as shown in FIG. 12, each displayed character is successively changed from the initial black or solid style into the white or outlined style with the progression of the song performance. Though the character size is varied in association with the voicing volume in this embodiment, the character style may be varied to visually teach various vocalisms to assist in skillful singing in manner similar to the first embodiment.

Figures 13, 14:
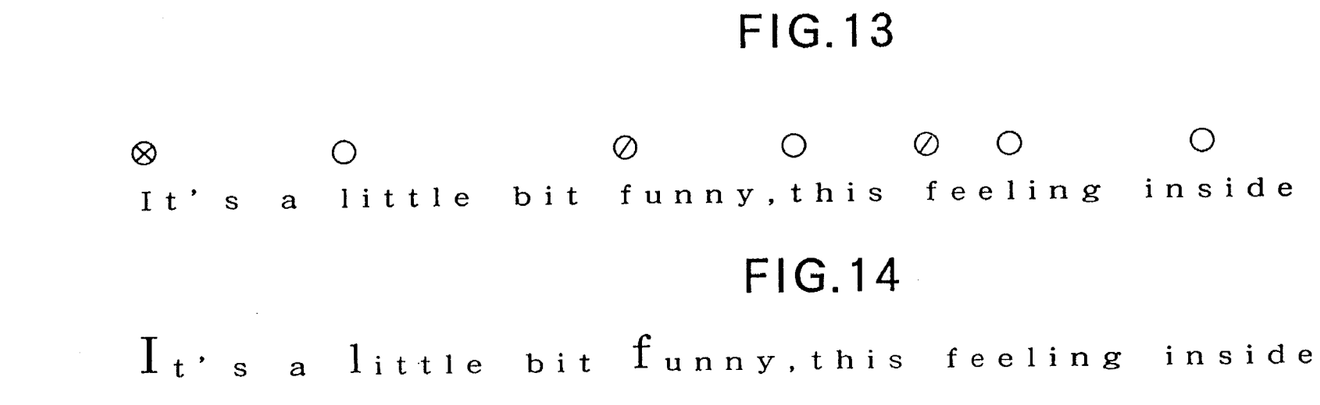
FIGS. 13–17 show an example of English song words displayed and expressed according to the invention.
Figure 15:
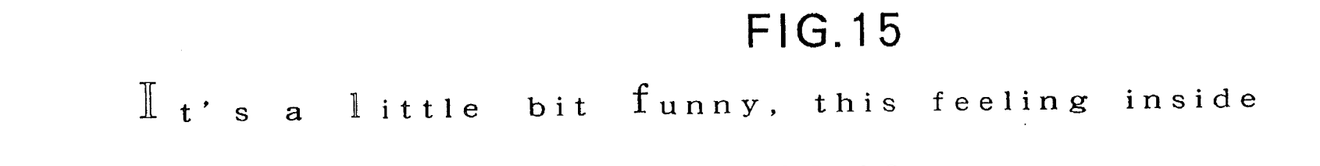
Figure 16:
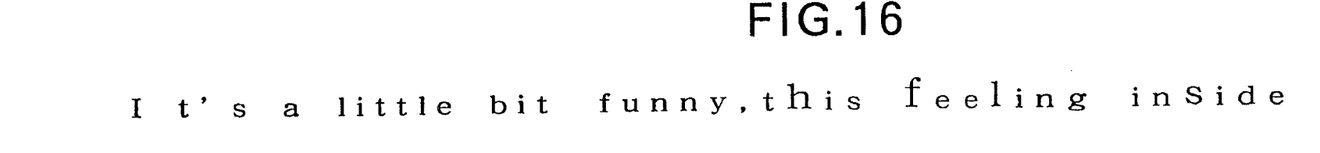
Figure 17:
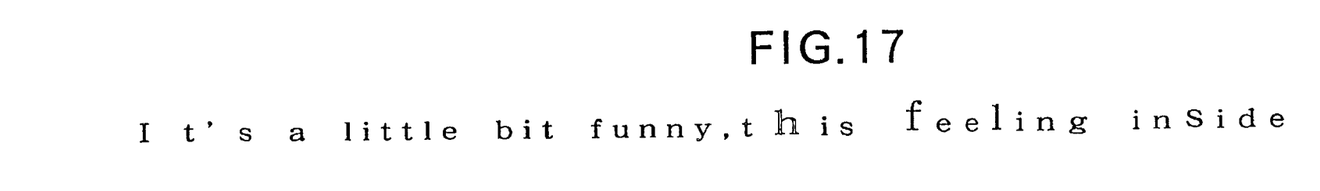

FIGS. 13–17 show an example of English song words displayed and expressed according to the invention. For better understanding, FIGS. 13–17 illustrate successive display states corresponding to those of FIGS. 8–12, respectively. In FIG. 13, mark ⊗ indicates a very strong voicing point, mark ⊘ indicates a strong voicing point, and mark ○ indicates a moderately strong voicing point.

Accordingly in the second embodiment, the vocal timing is indicated by successively changing a style of each character of the displayed words in recognizable manner, while the letter size of each character is arranged such as to visually illustrate proper vocalism. Consequently, even a beginner can perform singing in proper vocal expression to thereby enjoy the Karaoke in skillful manner. Accordingly, the Karaoke apparatus may be suitable for practicing the song performance. Further, in this second embodiment, the position and order of each character to be voiced is indicated by changing the letter style rather than by changing the letter color. Therefore, even a handicapped performer having abnormal color sight may advantageously recognize vocal timings. Moreover, supplementary information display by character color tone may be added to main information display by character size and style to provide more practical instructions for the performer. Aside from the above described embodiments, vocal timings may be indicated by outlined characters, and volumes may be indicated by different color tones of the characters. For example, bright (or warm) color tone may indicate stronger voicing, and dark (or cold) color tone may indicate weaker voicing.

As described above, according to the invention, a sequence of characters of the song words can be displayed in synchronization with the instrumental accompaniment by using variable letter patterns effective to indicate practical performance instructions such as vocalism and voice timing to thereby provide a joyful Karaoke apparatus.

What is claimed is:

1. A Karaoke apparatus for reproducing an automatic instrumental accompaniment of a selected song during the course of a physical vocal performance of the selected song by a singer, the Karaoke apparatus comprising:

register means for registering a prescribed text data of a selected song, containing accompaniment information and word information composed of a sequence of characters;

sound means for reproducing an automatic instrumental accompaniment according to the registered accompaniment information;

graphic means for modifying a graphic shape of plural registered characters in association with a predetermined practical manner of the physical vocal performance; and display means for displaying a sequence of the characters in the modified graphic shapes concurrently with the reproduction of the automatic instrumental accompaniment so as to visually teach the singer the practical manner during the physical vocal performance.

2. A Karaoke apparatus according to claim 1; wherein the graphic means includes means for varying a graphic shape of registered characters in association with a predetermined vocalism including at least one of volume, groan, falsetto, vibrato and grace.

3. A Karaoke apparatus according to claim 1; wherein the graphic means includes means for sequentially changing a graphic shape of registered characters in association with a predetermined voice timing of each respective character.

4. A Karaoke apparatus according to claim 1; wherein the graphic means includes means for modifying a size of the graphic shapes of registered characters.

5. A Karaoke apparatus according to claim 1; wherein the graphic means includes means for modifying a style of the graphic shapes of registered characters.

* * * * *